Figures 3, 4:
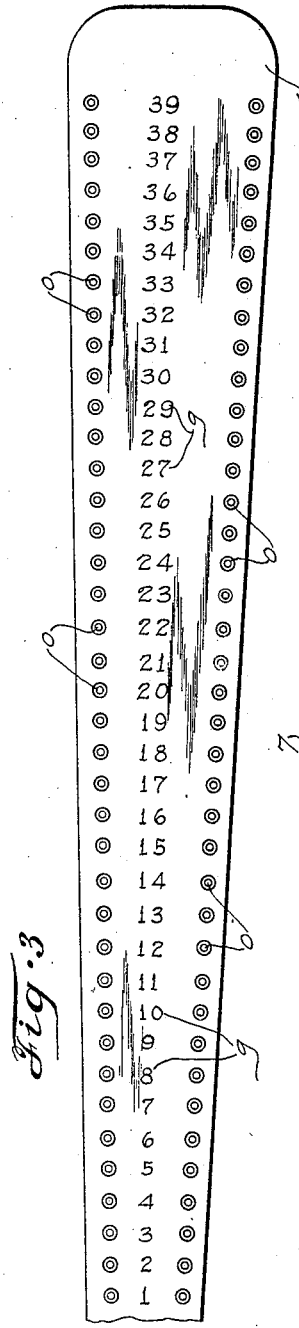

May 6, 1924.
A. ROTHSCHILD
1,492,811
RULING DEVICE FOR LAYING OFF PATTERNS
Filed Jan. 9, 1922   2 Sheets-Sheet 1
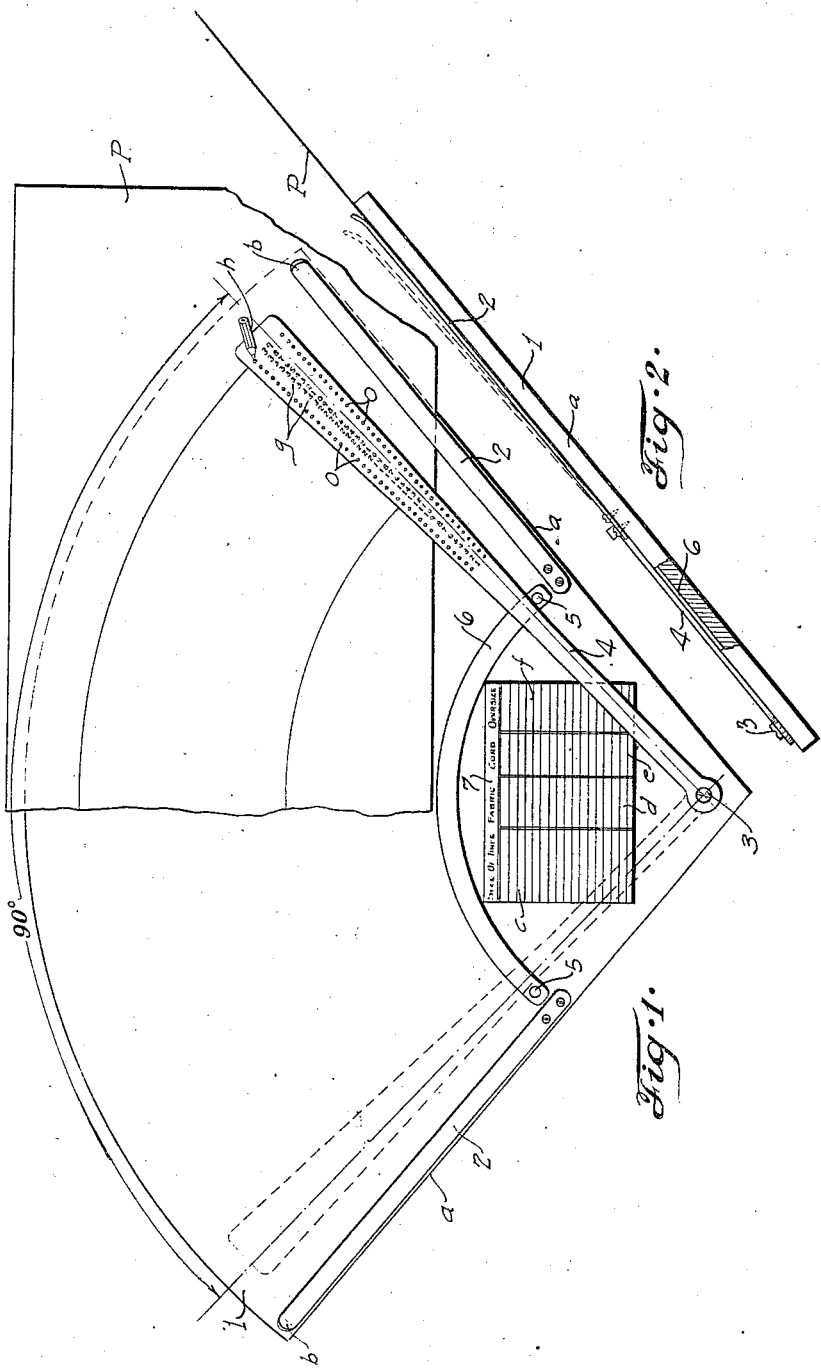
INVENTOR
Adolph Rothschild.
By Harry A. Beimes
ATTORNEY May 6, 1924.

A. ROTHSCHILD 1,492,811

RULING DEVICE FOR LAYING OFF PATTERNS

Filed Jan. 9, 1922    2 Sheets-Sheet 2

| SIZE OF TIRES | FABRIC | CORD | OVERSIZE |
|---|---|---|---|
| 30" × 3" | 23 × 7 | 25 × 7 | 24 × 7 |
| 30" × 3½" | 23 × 5 | 25 × 5 | 26 × 5 |
| 31" × 3½" | 25 × 7 | 27 × 7 | 26 × 7 |
| 31" × 4" | 25 × 5 | 27 × 5 | 26 × 5 |
| 32" × 4" | 27 × 7 | 29 × 7 | 28 × 7 |
| 32" × 4½" | 27 × 5 | 29 × 5 | 28 × 5 |
| 33" × 4" | 29 × 9 | 31 × 9 | 30 × 9 |
| 33" × 4½" | 29 × 7 | 31 × 7 | 30 × 7 |
| 33" × 5" | 29 × 5 | 31 × 5 | 30 × 5 |
| 34" × 4" | 31 × 11 | 33 × 11 | 32 × 11 |
| 34" × 4½" | 31 × 9 | 33 × 9 | 32 × 9 |
| 34" × 5" | 31 × 7 | 33 × 7 | 32 × 7 |
| 35" × 4½" | 33 × 11 | 35 × 11 | 34 × 11 |
| 35" × 5" | 33 × 9 | 35 × 9 | 34 × 9 |
| 36" × 5" | 35 × 11 | 37 × 11 | 36 × 11 |
| 37" × 5" | 37 × 13 | 39 × 13 | 38 × 13 |

INVENTOR
Adolph Rothschild.
BY Harry A. Beimer
ATTORNEY

Patented May 6, 1924.

1,492,811

UNITED STATES PATENT OFFICE.

ADOLPH ROTHSCHILD, OF ST. LOUIS, MISSOURI.

RULING DEVICE FOR LAYING OFF PATTERNS.

Application filed January 9, 1922. Serial No. 527,965.

*To all whom it may concern:*

Be it known that I, ADOLPH ROTHSCHILD, a citizen of the United States, residing at St. Louis and State of Missouri, have invented certain new and useful Improvements in Ruling Devices for Laying Off Patterns, of which the following is a specification.

My invention has relation to improvements in ruling devices and charts to be used in connection therewith for laying off segments of a predetermined size for any desirable purpose, more particularly, however, for laying off patterns for automobile tire covers.

As is well known, the extra tires carried on an automobile are encased in a suitable covering for protection against dust and dirt, and the elements. As far as I am aware, these tire covers are made by hand, and the cover for each size of tire must be made from an individual pattern for that size of cover. Now, the covers are made in sections, there being generally four sections for each side of the cover and a medial strip for connecting the sections. Obviously each cover section is, therefore, a segment of 90° plus the necessary allowance for seams. Considering the variation in different sizes of tires, it is impossible to have a cover pattern that can be used for more than one size, consequently each tire cover must have its own pattern which must be separately figured out, due allowance being made for seams, etc. The time consumed in laying out a pattern is considerable, and the liability of error great. It is the object of the present invention to provide a chart and ruling device by which a tire cover of any size can be laid off in sections in a negligible amount of time. I attain this object by providing a chart whereon the sizes of tires are tabulated, and opposite each size are two numbers denoting the inner and outer arcs to be described, said chart being used in connection with an oscillatable beam on which numbers corresponding to those on the chart are located on computed arcs defining the desired tire-cover section.

Further advantages as well as the method of operation of the invention will be better apparent from a detailed description of the invention in connection with the accompanying drawings, in which—

Figure 1 is a plan view of the ruling device having the chart positioned thereon for convenience; Fig. 2 is an edge view of the ruling device; Fig. 3 is an enlarged face view of the beam for ruling the arcs; Fig. 4 is a face view of the chart.

Referring to the drawings, 1 represents a board in the form of a sector of a circle comprising somewhat more than 90°. Located contiguous to and parallel with the straight sides $a$, $a$, are spring clips 2, 2 fixed to the board 1 at their inner ends and normally bearing against the board, the outer ends of said clips being turned up slightly at $b$ to enable one to raise them from the board (dotted Fig. 2) with his finger so that a sheet of paper P can be slipped under them and held in place on the board. Pivoted on a screw 3 at the geometrical center of the circle of which the board 1 is a sector is a beam 4, said beam being oscillatable over the board 1 between predetermined extremes, the movement of the beam being limited by stop pins 5, 5 equidistant from the screw 3 and somewhat more than 90° apart. The stop pins 5, 5 project upwardly from an arcuate plate 6 depressed in the board 1 so that its upper surface is in a common plane with that of the upper surface of the board.

A chart 7 is fixed onto the board 1 preferably between the plate 6 and screw 3, and said chart is divided into four spaces $c$, $d$, $e$, and $f$. In the left hand space $c$ the various sizes of automobile tires are tabulated, from 30" x 3" to 37" x 5", and in the other spaces $d$, $e$, and $f$ empirical numerals are tabulated in pairs for the different kinds of tires (fabric, cord and oversize) said numerals denoting the inner and outer arcs, such as 23 x 7 for a fabric tire 30" x 3" in size, that are to be described in laying off a pattern for a cover for this particular size. The numerals in column $d$, $e$, and $f$ denote the radii that are to be used in describing an arc with the beam 4. The beam 4 is provided with a row of holes $o$ adjacent to each radial edge, said holes being disposed in pairs and having a numeral $g$ between the holes of each pair, said numeral denoting the radius that will be described by its pair of holes when the beam 4 is oscillated or swung across the board 1. These numerals $g$, of course, correspond to those in the columns $d$, $e$, and $f$ of the chart. The manner of laying off a pattern for a cover for a given size of tire can be best understood by an example.

Suppose the operator desires to lay off a pattern for a tire-cover that will encase a 37" x 5" cord tire. He finds 37" x 5" in his table of tire sizes on the chart 7, and then looks in the column of numerals under "cord" (column e) for the numbers in line with 37" x 5" size of tire, which are 39 x 13. After having placed a sheet of paper over the board under the clips 2, 2 he then places his pencil h in one of the holes o opposite the numeral 39 on the beam 4 and describes an arc by moving the beam from one extreme position to the other, shifting his pencil to the opposite hole 39 to complete the arc on the one side (owing to the width of the beam). He next describes an arc in the same manner with his pencil in the holes opposite numeral 13, after which he describes the radial limits of the arc by drawing his pencil along the outer edge of the beam 4 in both its extreme positions. The pattern for a 37" x 5" cord tire is now laid off, after which it may be cut out and used to make cover sections. It will be observed that the extreme positions of the outer edges of the beam comprehend an angle somewhat more than 90°, the object of which is to make due allowance for seams where the respective cover sections are sewed together. A proper allowance is also made in the initial calculation for peripheral seams.

From the foregoing it will be readily apparent that anyone can lay off a pattern for any size of tire-cover in a very few minutes by means of my ruling device and chart.

Having described my invention, I claim:

1. In combination, a ruling device for patterns comprising a board, a beam pivotally mounted thereon, stops for confining the oscillations of the beam between predetermined extremes, various radii being marked on the beam by suitable notations, and the beam being perforated opposite each notation.

2. In combination, a ruling device for patterns comprising a board, spring clips mounted on opposite sides thereof for holding a sheet of paper thereon, a beam pivotally mounted thereon, stops for confining the oscillations of the beam between predetermined extremes, various radii being marked on the beam by suitable notations, and the beam being perforated opposite each notation.

3. A ruling device for patterns comprising in combination, a board, a beam pivotally mounted thereon, and stops for confining the oscillations of the beam to an angle of 90° plus a predetermined amount, said beam having a series of perforations along each edge thereof.

In testimony whereof I hereunto affix my signature.

ADOLPH ROTHSCHILD.